(12) United States Patent
Pietrusiak

(10) Patent No.: US 6,600,921 B1
(45) Date of Patent: Jul. 29, 2003

(54) DUAL COVERAGE GRID METHOD

(75) Inventor: Stephan Pietrusiak, Redondo Beach, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/505,575

(22) Filed: Feb. 16, 2000

(51) Int. Cl.⁷ .................................. H04Q 7/20
(52) U.S. Cl. ............... 455/429; 455/427; 455/13.3; 244/158 R; 342/354
(58) Field of Search ................ 455/427, 429, 455/447, 13.3, 446; 244/158 R; 342/354

(56) References Cited

U.S. PATENT DOCUMENTS

| | | | |
|---|---|---|---|
| 4,178,550 A | * | 12/1979 | Acampora et al. .......... 714/794 |
| 5,625,868 A | * | 4/1997 | Jan et al. ................... 455/13.4 |
| 5,850,608 A | | 12/1998 | Faruque |
| 6,317,412 B1 | * | 11/2001 | Natali et al. ................. 370/208 |
| 6,323,817 B1 | * | 11/2001 | Ramanujam et al. .... 343/781 P |
| 6,377,558 B1 | * | 4/2002 | Dent ........................ 370/321 |

* cited by examiner

*Primary Examiner*—William Trost
*Assistant Examiner*—Simon Nguyen
(74) *Attorney, Agent, or Firm*—Gates & Cooper LLP

(57) ABSTRACT

A method and apparatus for producing contiguous spot beam communications coverage on the Earth's surface are disclosed. The apparatus comprises two contiguous beam patterns. The first contiguous beam pattern comprises a first set of cells and has a first set of frequencies. The second contiguous beam pattern comprises a second set of cells and has a second set of frequencies. The second contiguous beam pattern is spatially offset from the first contiguous beam pattern such that an edge of the first set of cells is offset from an edge of the second set of cells. Multiple two grid systems can maintain isolation performance of single grid system.

9 Claims, 5 Drawing Sheets

DUAL COVERAGE GRID METHOD

BACKGROUND OF THE INVENTION

1. Field of the Invention

This invention relates in general to antenna systems, and in particular to a dual coverage grid method for increased signal coverage.

2. Description of Related Art

Communications satellites have become commonplace for use in many types of communications services, e.g., data transfer, voice communications, television spot beam coverage, and other data transfer applications. As such, satellites must provide signals to various geographic locations on the Earth's surface. As such, typical satellites use customized antenna designs to provide signal coverage for a particular country or geographic area.

In order to provide signal coverage over a large area, several approaches are used. A single beam with a wide beamwidth is sometimes used, but is limited in terms of power delivery over such a large geographic area. Typically, to cover a large geographic area, contiguous spot beams are used.

Contiguous spot beams are generated by multiple antennas to cover a large geographic area with a small variation in measured signal strength at the ground. The contiguous beams typically generate a grid that provides a certain Effective Incident Radiated Power (EIRP) throughout the coverage area for the spacecraft. However the EIRP that can be delivered by a given spacecraft and/or antenna system is limited by amplifier power, bandwidth, and antenna size.

Other advances for satellite communications have come in the personal communications system (PCS) system, or world-wide cellular telephony. Typical cellular telephony uses cell division to increase signal throughput in certain high-traffic areas. These smaller additional cells are created by installing additional antenna sites at each cell. Similarly, satellites can create smaller grid cells by using additional beams, transmitters, and antennas.

However, since each satellite is limited in the number of antennas, transmitters, and beams that it can support, adding more hardware to the system is typically cost prohibitive.

It can be seen, then, that there is a need in the art for antenna systems that can deliver contiguous spot beams over large geographic areas that can carry additional signals. It can also be seen that there is a need in the art for antenna systems that can deliver signals for mobile applications without signal interruption. It can also be seen that there is a need in the art for antenna systems that provide ease of mechanical design and construction to reduce spacecraft costs.

SUMMARY OF THE INVENTION

To overcome the limitations in the prior art described above, and to overcome other limitations that will become apparent upon reading and understanding the present specification, the present invention discloses a method and apparatus for producing contiguous spot beam communications coverage on the Earth's surface. The apparatus comprises two contiguous beam patterns. The first contiguous beam pattern comprises a first set of cells and has a first set of frequencies. The second contiguous beam pattern comprises a second set of cells and has a second set of frequencies. The second contiguous beam pattern is spatially offset from the first contiguous beam pattern such that an edge of the first set of cells is offset from an edge of the second set of cells.

The method comprises the steps of producing a first contiguous spot beam pattern on the Earth's surface, producing a second contiguous spot beam pattern on the Earth's surface, and overlapping the first contiguous spot beam pattern and the second contiguous spot beam pattern such that an edge of the first contiguous spot beam pattern is offset from an edge of the second contiguous spot beam pattern.

The present invention provides antenna systems that can deliver contiguous spot beams over large geographic areas that can carry additional signals. The present invention also provides antenna systems that can deliver signals for mobile applications without signal interruption. The present invention also provides antenna systems that provide ease of mechanical design and construction to reduce spacecraft costs.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview of Related Art

Contiguous spot beam coverage is commonly used in many satellite antenna designs, especially in applications that require higher antenna gains to compensate for severe propagation effects.

Figure 1:
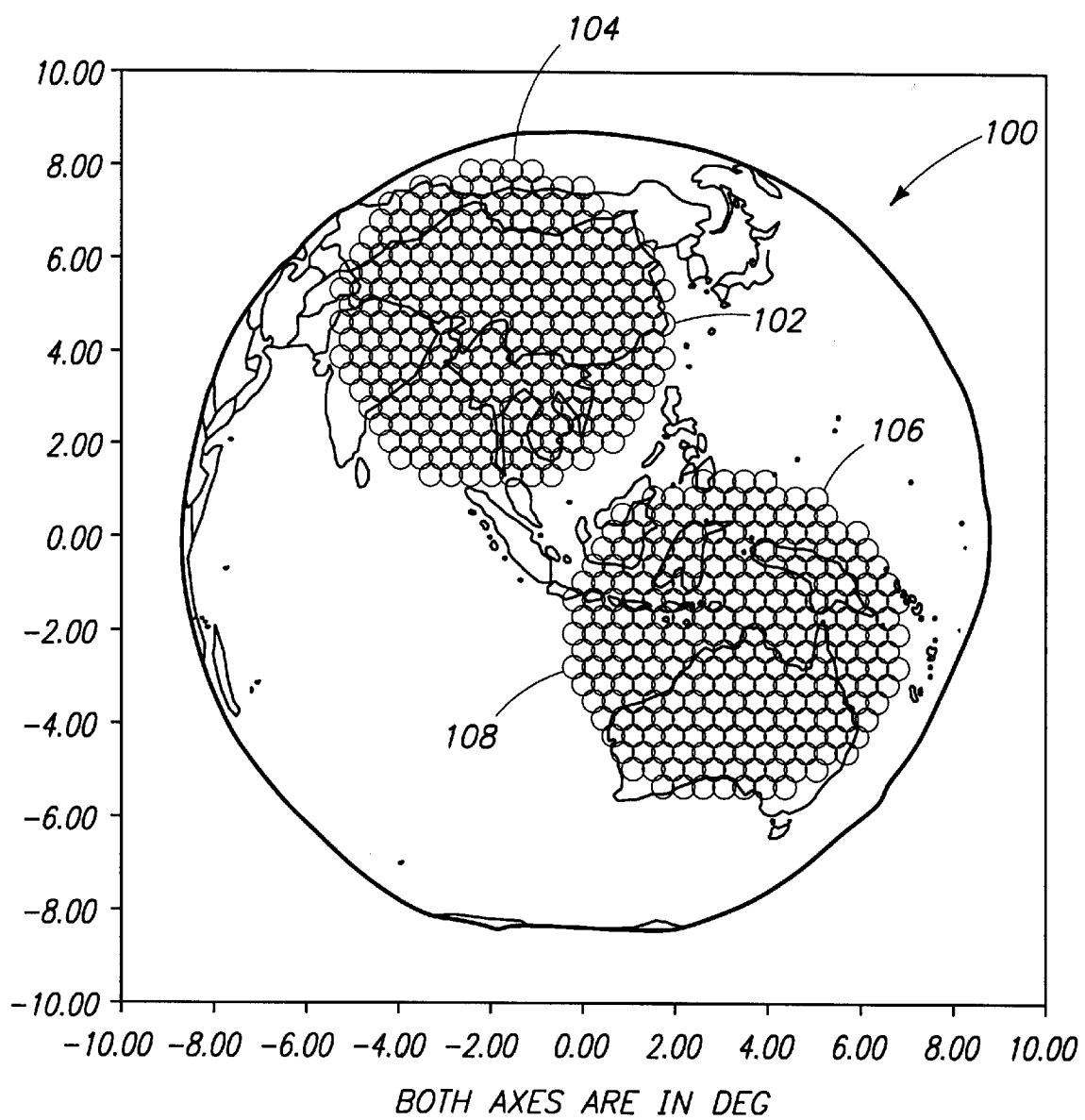
FIG. 1 illustrates a typical satellite perspective of the Earth with multiple desired beam patterns.

FIG. 1 illustrates a typical satellite perspective of the Earth with multiple desired beam patterns. Earth 100 is shown from the perspective of a satellite, typically a satellite in geosynchronous orbit.

The satellite provides communications signals, called beams, that provide the proper signal strength to communicate with antennas on the Earth's 100 surface. However, because of power limitations, desired coverage areas, etc., a single antenna cannot provide coverage for the entire visible portion of the Earth's 100 surface. Specific geographic areas are selected by the satellite designer for communications coverage. The satellite typically provides communications services in one or more selected geographic areas by using multiple antenna beams. Each beam has a signal strength that is typically higher in the center of the beam than at the edge of the beam.

As shown in FIG. 1, a spacecraft typically must deliver a communications signal to desired locations on the surface of the Earth 100. As communications services demand increases, the size of the geographic locations increases as well.

Location 102, shown in the Northern Hemisphere, is typically covered using spot beams 104, whereas location 106, shown in the Southern Hemisphere, is typically covered using spot beams 108. Each spot beam 104 and 108 delivers a peak signal strength at the center of the beam, and the signal strength tapers off towards the edge of each beam 104 and 108.

Overview of the Invention

The current invention discloses a technique for using a dual antenna coverage grid offset by half a cell to enable the use of higher antenna directivities by selecting the beam from grid 1 or grid 2 with the highest directivity. This is achieved by having the same high-frequency re-use as a 1-grid system. Furthermore, by using half a cell offset from the first grid, the same control beams from the first grid can be used to control the second grid beams if GPS positioning is not used.

This approach can be extended to three, four, or more grids to further optimize performance if desired. The extension to additional grids may require additional subbands for the system. For example, the triple point (intersection) beam placement in a three grid system yields higher average and lower directivity than a two grid system. For a two grid system, a triple point system can only cover approximately half of the triple points in a hexagonal cell structure and the same minimum directivity points are still present approximately half of the time compared to the single grid system Further, the present invention can be applied selectively throughout a grid system. For example, if there are only certain areas within the grid that require additional signal handling capability, the second grid can be overlayed only for those areas. Further, the second grid can be offset different amounts at the selective areas to maximize signal throughput.

Grid Overlay

Figure 2A:
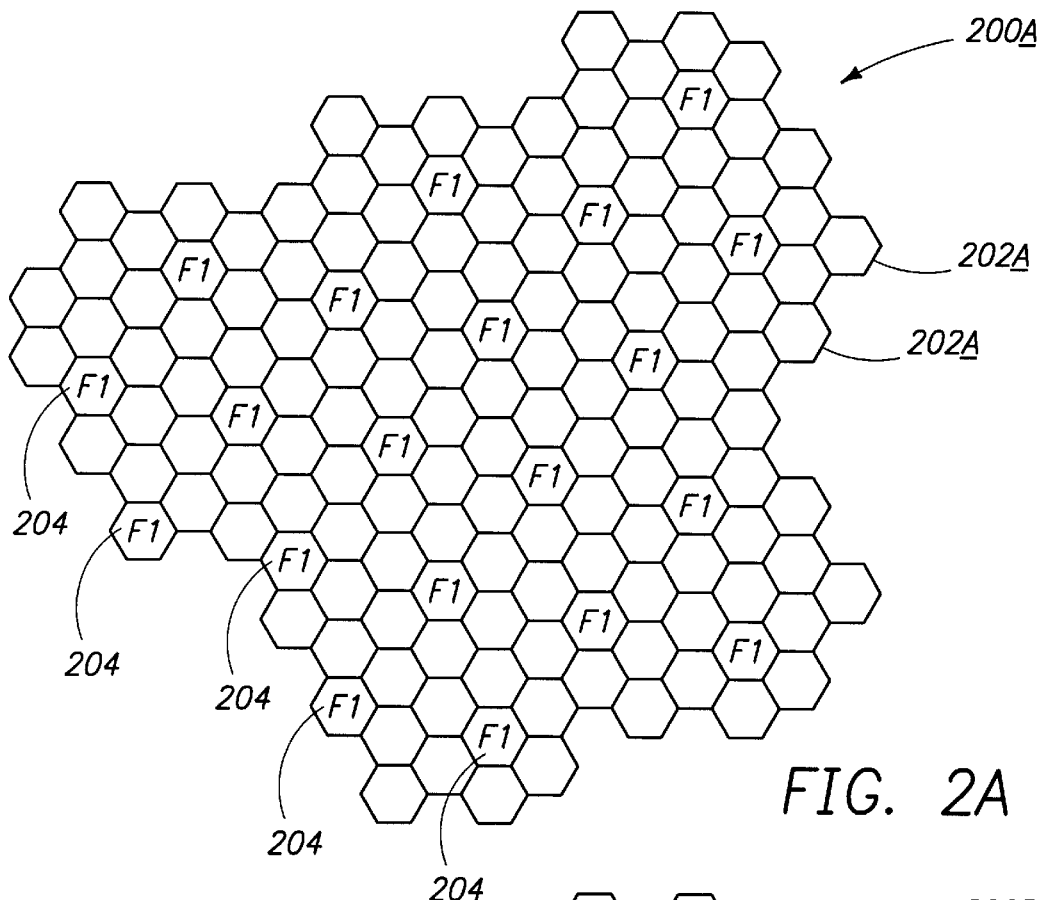
FIGS. 2A–2D illustrate the grid overlay of the present invention.

FIGS. 2A–2D illustrate the grid overlay of the present invention. FIG. 2A illustrates a typical hexagonal grid pattern 200A generated by antennas on a satellite. This pattern can be generated by a phased array antenna, or by multiple antennas. Typical cell 202A covers a specific geographic area. Cell 204 is indicated as using frequency F1 throughout the cell. Frequency F1 is shown as being in a "seven-cell reuse" pattern, meaning that cells 204 that use frequency F1 are surrounded by six cells 202 not using frequency F1. Other frequency reuse patterns can also be used without deleterious effect on the present invention. Once frequency F1 is used in the seven cell reuse pattern across the entire pattern 200A, frequency F1 is no longer available for use within pattern 200A.

Figure 2B:
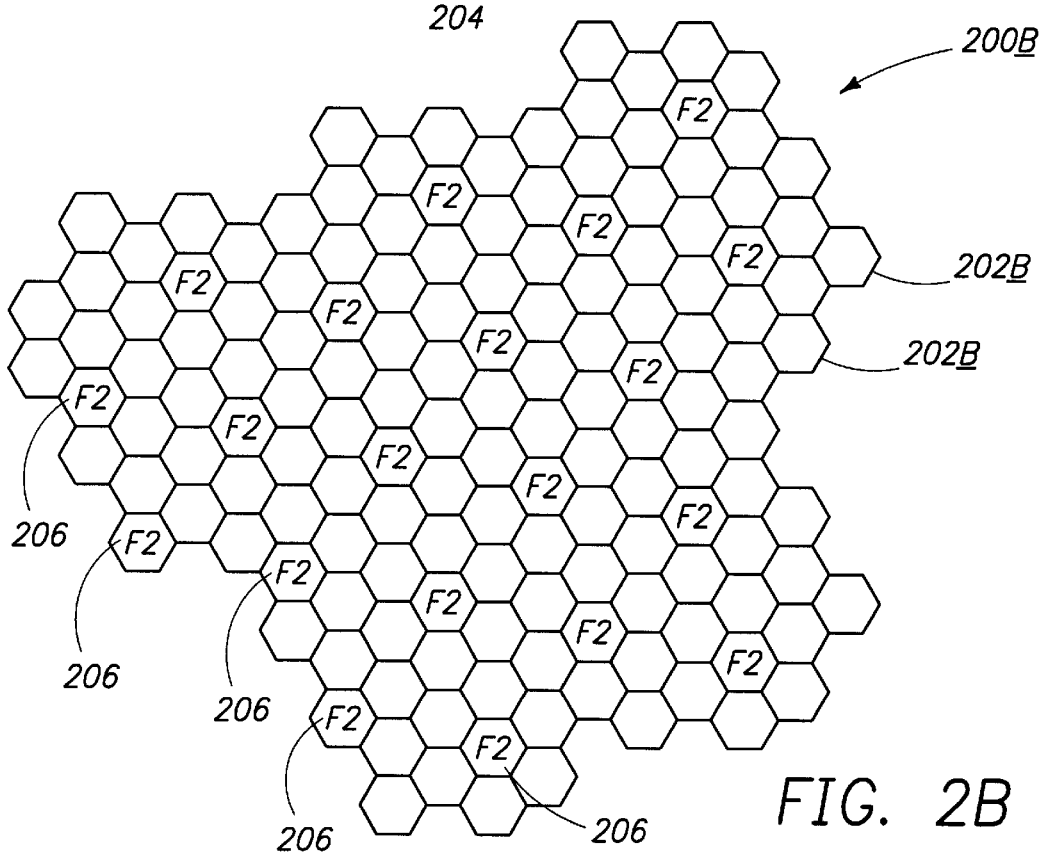

FIG. 2B illustrates a typical hexagonal grid pattern 200B with typical cells 202B and cells 206 indicated as using frequency F2 throughout cells 206 in a seven cell reuse pattern. Once frequency F2 is used in the seven cell reuse pattern across the entire pattern 200B, frequency F2 is no longer available for use within pattern 200B.

Figure 2C:
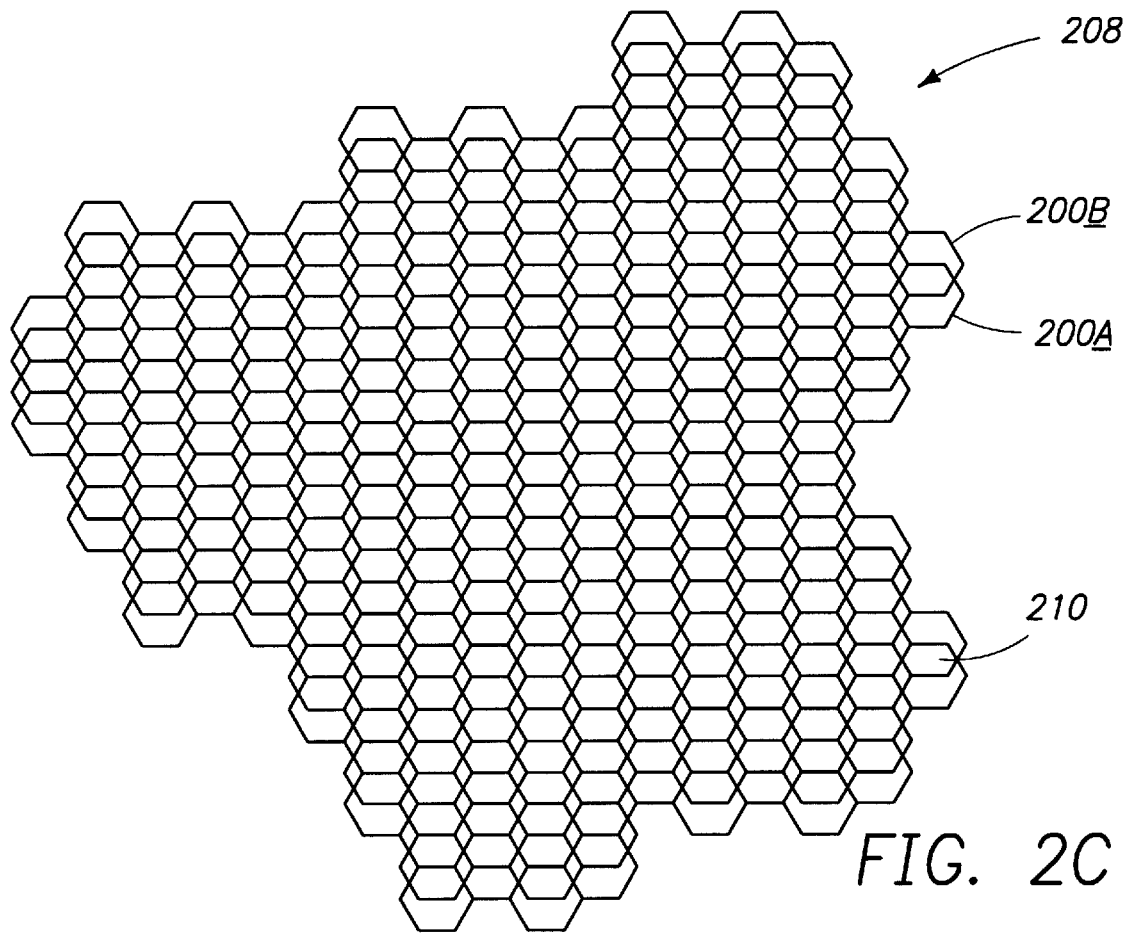

FIG. 2C illustrates the overlay of patterns 200A and 200B into pattern 208. Pattern 200A is shown as being offset from pattern 200B one half cell "down" from pattern 200B. The overlay pattern 208 effectively has cells 210 that are now one-half of the area of cells 202A, 202B, 204, and 206. This allows for greater signal throughput of the system.

Figure 2D:
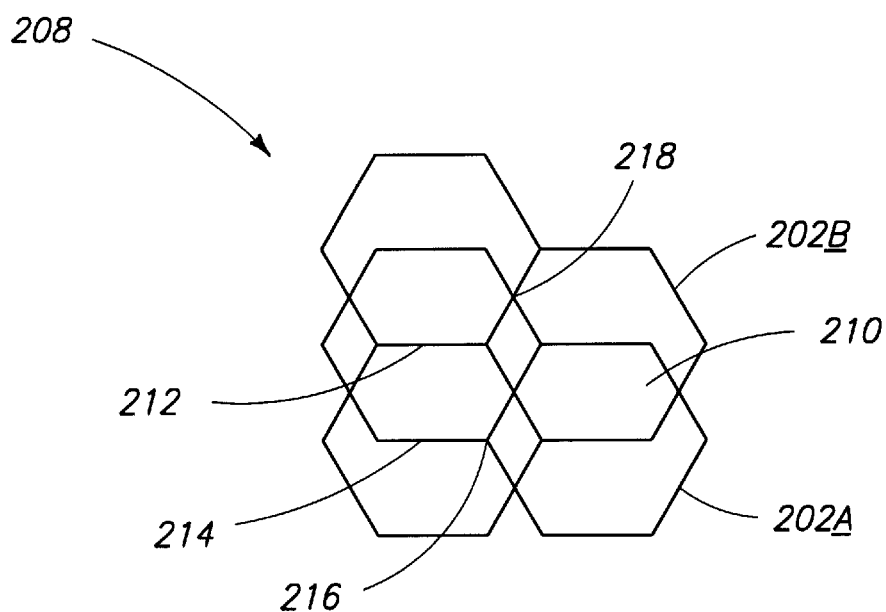

FIG. 2D is a magnified portion of FIG. 2C Cell 210 is defined as the intersection of cell 202A from pattern 200A and cell 200B from pattern 200B. As a user travels through cell 202B and reaches edge 212, the signal strength of cell 202B is reaching the point where communication with the user may no longer be possible without a handoff to an adjacent cell 202B if only pattern 200B is being used. If the adjacent cell 202B is already at capacity, the user will not be able to continue communication. However, edge 212 is in the middle of cell 202A, which has sufficient signal strength to sustain communication paths, and a handoff is possible to the second pattern 200A without affecting the users in cells 202B. Similarly, when a user travelling through cell 202A and reaches edge 214, the signal strength of cell 202A is reaching the point where communication with the user may no longer be possible without a handoff to an adjacent cell 202A. By using pattern 208, additional signal capacity is available for mobile users that approach edges 212 and 214 of cells 202A and 202B.

Triple point 216 also falls within the boundaries of a cell 202B and as such allows for additional capacity for users at those geographic locations without excessive handoffs within pattern 200. Intersection point 218 can be handled within a single pattern 200A or 200B or can be switched between patterns 200A and 200B as desired.

Although shown with an exact one-half cell offset between patterns 200A and 200B, other offsets can be performed. Further, the offset of pattern 200A with respect to pattern 200B can up and down, side to side, or any combination of up and down and side to side.

The beam patterns 200A and 200B are typically created using a phased array antenna with beamweights for each antenna element to generate a desired pattern 200A or 200B. Minimum beam sizes are used to generate the smallest cell 202A size within pattern 200A. To further reduce the beam size, additional elements are required within the antenna system, which would then require additional hardware for support and result in additional weight on the spacecraft. By assigning proper beamweights to the beams, and using additional pattern 200B to generate pattern 208, the beam sizes are effectively reduced to one half of the beam size segmented into rectangular zones without adding any additional hardware or increasing the weight of the spacecraft.

The improvement in directivity provided by pattern 208 depends on the difference between the peak signal strength at the center of the beam to the signal strength at the edge of the beam. The greater the difference, the greater the improvement using additional grids to cover the geographic area. For example, with a peak-to-edge signal strength (directivity) difference of 3 dB, the average directivity is improved by approximately 0.5 dB and the minimum required signal strength is improved by 0.84 dB. This allows for lower power mobile communications devices, lower power satellites, or any combination of the two ends of the communications link having a lower power of up to 0.84 dB in the exemplary system to continue communications. Such a reduction increases battery life in mobile communications devices, or could reduce launch weight of the satellite which reduces satellite costs.

To determine which pattern, e.g., 200A or 200B, that a particular user will be assigned to, power measurements can be made on the signal strength either at the user end or at the satellite end, Global Positioning System (GPS) data can be used to determine the user location to switch between patterns 200A and 200B, or other heuristic methods can be used to determine when to place user in pattern 200A or 200B, or to switch user between pattern 200A and 200B.

Frequency Reuse Configuration

Figure 3A:
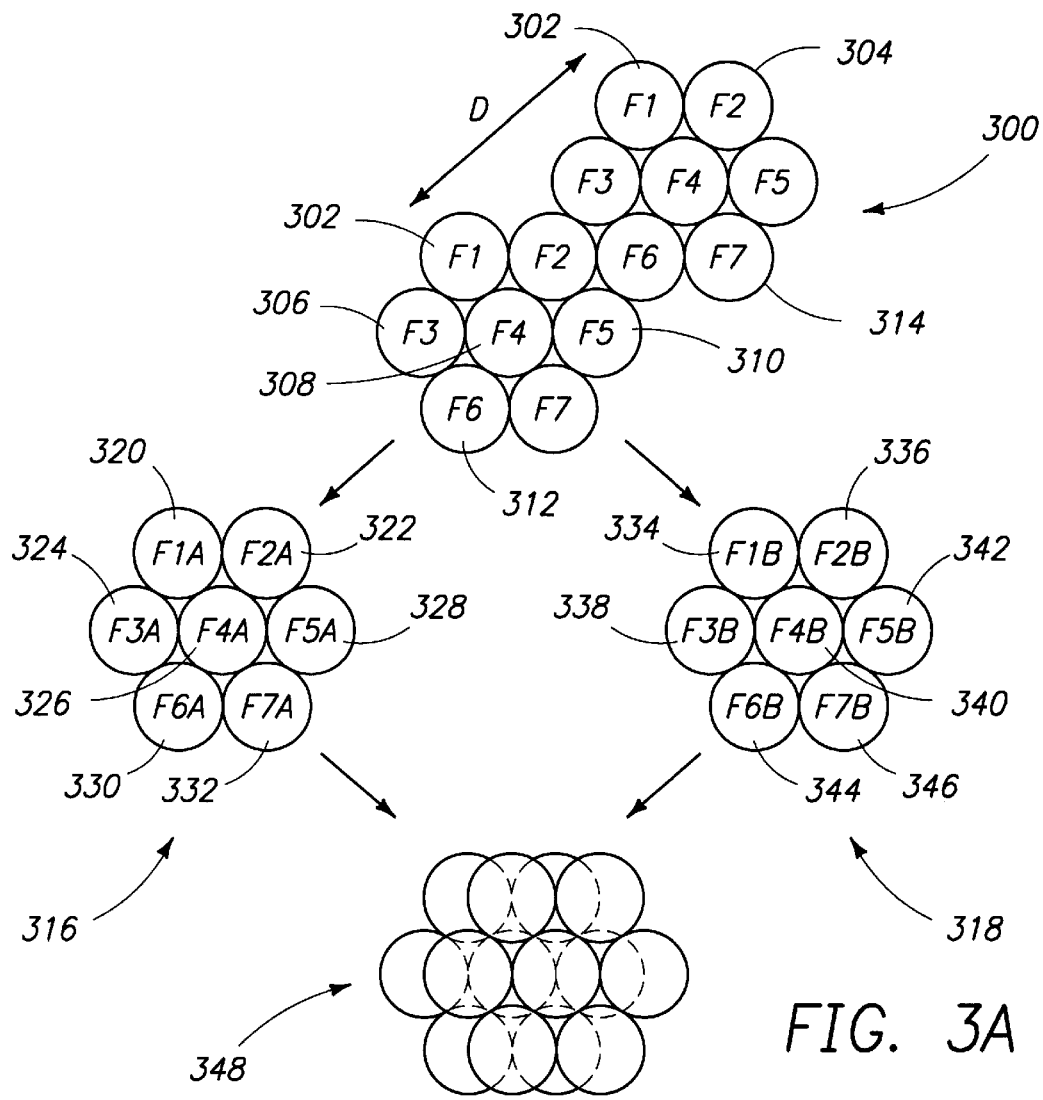
FIGS. 3A–3B illustrate a typical reuse configuration employing the present invention.
Figure 3B:
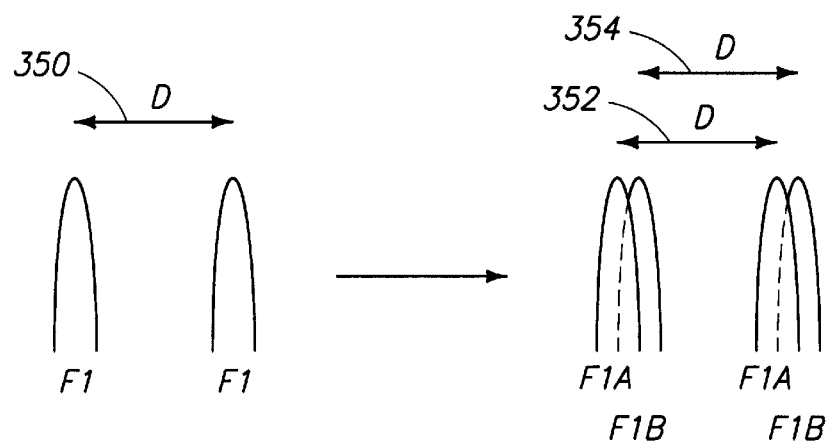

FIGS. 3A–3B illustrate a typical reuse configuration employing the present invention. Pattern 300 illustrates a typical seven cell reuse pattern, where cells 302 use frequency range F1, cells 304 use frequency range F2, cells 306 use frequency range F3, cells 308 use frequency range F4, cells 310 use frequency range F5, cells 312 use frequency range F6, and cells 314 use frequency range F7.

To offset pattern 300 into a two pattern system, each frequency range F1–F7 is separated. For example, frequency range F1 is separated into frequency range F1A and frequency range F1B, where frequency range F1A uses a certain number of subbands within frequency range F1 and frequency range F1B uses other subbands within frequency range F1. Patterns 316 and 318 are shown, with pattern 316 having cells 320 using frequency range F1A, cells 322 use frequency range F2A, cells 324 use frequency range F3A, cells 326 use frequency range F4A, cells 328 use frequency range F5A, cells 330 use frequency range F6A, and cells 332 use frequency range F7A.

Similarly, pattern 318 has cells 334 using frequency range F1B, cells 336 use frequency range F2B, cells 338 use frequency range F3B, cells 340 use frequency range F4B, cells 342 use frequency range F5B, cells 344 use frequency range F6B, and cells 346 use frequency range F7B.

Patterns 316 and 318 are combined to form pattern 348. Pattern 348 now uses the same seven frequency ranges F1–F7, but divides the cells such that no subband is repeated within the seven-cell reuse pattern.

FIG. 3B illustrates that the separation between cells is maintained after the separation of the subbands described in FIG. 3A Pattern 300 has a distance 350 between the frequencies F1, where the distance 350 defines the cell distance in the reuse pattern. After separation, distance 350 is replaced by offset distance 352 between frequencies F1A in cells 320, and offset distance 354 between frequencies F1B in cells 334. As such, the separation between cells is maintained.

Process Chart

Figure 4:
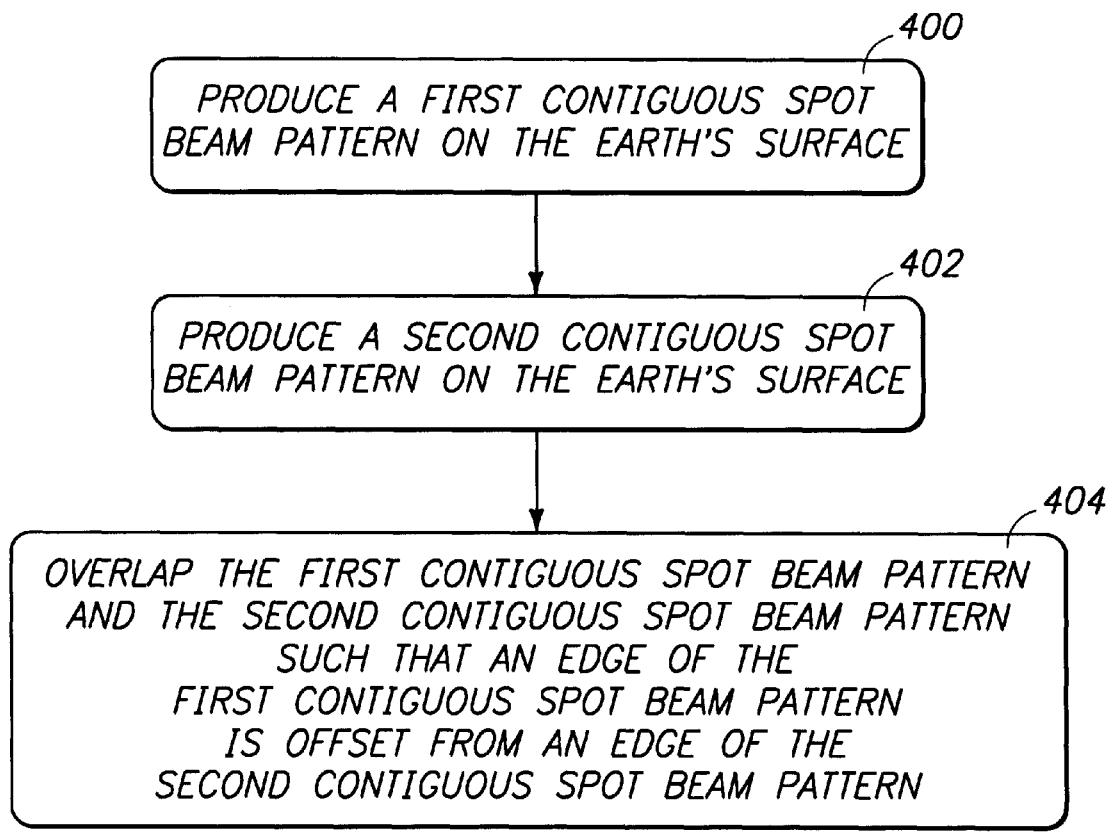
FIG. 4 is a flow chart illustrating the steps used to practice the present invention.

FIG. 4 is a flow chart illustrating the steps used to practice the present invention.

Block 400 illustrates performing the step of producing a first contiguous spot beam pattern on the Earth's surface.

Block 402 illustrates performing the step of producing a second contiguous spot beam pattern on the Earth's surface.

Block 404 illustrates performing the step of overlapping the first contiguous spot beam pattern and the second contiguous spot beam pattern such that an edge of the first contiguous spot beam pattern is offset from an edge of the second contiguous spot beam pattern.

Conclusion

This concludes the description of the preferred embodiment of the invention. The following paragraphs describe some alternative methods of accomplishing the same objects. The present invention, although described with respect to RF systems, can also be used with optical systems to accomplish the same goals.

In summary, the present invention discloses a method and apparatus for producing contiguous spot beam communications coverage on the Earth's surface are disclosed. The apparatus comprises two contiguous beam patterns. The first contiguous beam pattern comprises a first set of cells and has a first set of frequencies. The second contiguous beam pattern comprises a second set of cells and has a second set of frequencies. The second contiguous beam pattern is spatially offset from the first contiguous beam pattern such that an edge of the first set of cells is offset from an edge of the second set of cells.

The method comprises the steps of producing a first contiguous spot beam pattern on the Earth's surface, producing a second contiguous spot beam pattern on the Earth's surface, and overlapping the first contiguous spot beam pattern and the second contiguous spot beam pattern such that an edge of the first contiguous spot beam pattern is offset from an edge of the second contiguous spot beam pattern.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A system for delivering contiguous spot coverage from a satellite, comprising:

a first contiguous beam pattern comprising a first set of cells and having a first set of frequencies; and a second contiguous beam pattern comprising a second set of cells and having a second set of frequencies, the second contiguous beam pattern being say offset from the first contiguous beam pattern such that an edge of the first set of cells is offset from an edge of the second set of cells.

2. The system of claim 1, further comprising a third contiguous beam pattern, comprising a third set of cells and having a third set of frequencies, the third contiguous beam pattern being spatially offset from the fist contiguous beam pattern and the second contiguous beam pattern such that an edge of the third set of cells is offset from the edge of the first set of cells and offset from the edge of the second set of cells.

3. The system of claim 1, wherein the offset is one-half cell width.

4. The system of claim 1, wherein the first contiguous beam pattern and the second contiguous beam pat are generated by the same antenna.

5. The system of claim 4, wherein the antenna is a phased array antenna.

6. The system of claim 1, wherein the first set of frequencies and the second set of frequencies are subsets of a first frequency range.

7. A method for producing at least two contiguous spot beam patterns for communications from a satellite to the Earth'surface, comprising the steps of:

producing a first contiguous spot beam pattern on the Earth's surface;

producing a second contiguous spot beam pattern on the Earth's surface; and overlapping the first contiguous spot beam pattern and the second contiguous spot beam pattern such that an edge of the first contiguous spot beam pattern is offset from an edge of the second contiguous spot beam pattern.

8. The method of claim 7, further comprising the steps of producing a third contiguous spot beam pattern on the Earth's surface; and overlapping the third contiguous spot beam pattern beam with the first contiguous spot beam pattern and the second contiguous spot beam pattern such that an edge of the third contiguous spot beam patter is offset from the edge of the first contiguous spot beam pawn and offset from the edge of the second contiguous spot beam pattern.

9. The method of claim 7, wherein the offset is one-half of a spot beam width.

* * * * *

UNITED STATES PATENT AND TRADEMARK OFFICE
CERTIFICATE OF CORRECTION

PATENT NO. : 6,600,921 B1  Page 1 of 1
DATED : July 29, 2003
INVENTOR(S) : Stephan Pietrusiak It is certified that error appears in the above-identified patent and that said Letters Patent is hereby corrected as shown below:

Column 6,
Line 22, "say" should read -- spatially --
Line 36, "pat" should read -- pattern --
Line 44, "Earth'surface" should read -- Earth's surface --
Line 60, "patter" should read -- pattern --
Line 61, "pawn" should read -- pattern --

Signed and Sealed this

Fourteenth Day of October, 2003

JAMES E. ROGAN
*Director of the United States Patent and Trademark Office*